United States Patent
Chao

(10) Patent No.: US 10,784,773 B1
(45) Date of Patent: Sep. 22, 2020

(54) POWER CONVERSION APPARATUS AND SHORT CIRCUIT PROTECTION CIRCUIT AND METHOD OF CAPACITOR THEREOF

(71) Applicants: LITE-ON ELECTRONICS (GUANGZHOU) LIMITED, Guangzhou (CN); Lite-On Technology Corporation, Taipei (TW)

(72) Inventor: Yu-Pin Chao, Taipei (TW)

(73) Assignees: LITE-ON ELECTRONICS (GUANGZHOU) LIMITED, Guangzhou (CN); Lite-On Technology Corporation, Taipei (TW)

(*) Notice: Subject to any disclaimer, the term of this patent is extended or adjusted under 35 U.S.C. 154(b) by 0 days.

(21) Appl. No.: 16/535,082

(22) Filed: Aug. 8, 2019

(30) Foreign Application Priority Data

Jun. 24, 2019 (TW) .............................. 108121882 A

(51) Int. Cl.
| | |
|---|---|
| *H02H 9/04* | (2006.01) |
| *H02H 3/20* | (2006.01) |
| *H03H 3/02* | (2006.01) |
| *H02M 1/32* | (2007.01) |
| *H02M 5/45* | (2006.01) |
| *G05F 1/569* | (2006.01) |
| *H02H 3/02* | (2006.01) |

(52) U.S. Cl.
CPC .............. *H02M 1/32* (2013.01); *H02M 5/45* (2013.01); *G05F 1/569* (2013.01); *H02H 3/023* (2013.01); *H02H 3/202* (2013.01); *H02H 9/041* (2013.01); *H02H 9/043* (2013.01); *H02M 2001/322* (2013.01)

(58) Field of Classification Search
CPC . H02M 2001/322; H02H 3/023; H02H 3/202; H02H 9/041; H02H 9/043
USPC .................. 323/276; 363/53, 78, 84; 361/16
See application file for complete search history.

(56) References Cited

U.S. PATENT DOCUMENTS

| | | | | |
|---|---|---|---|---|
| 4,890,180 A | * | 12/1989 | Paulsson | H02H 7/16 |
| | | | | 361/16 |
| 4,926,280 A | * | 5/1990 | Richter | H02H 3/023 |
| | | | | 361/104 |
| 6,107,808 A | * | 8/2000 | McKee | H02H 7/16 |
| | | | | 324/548 |
| 9,537,327 B2 | * | 1/2017 | Lai | G01R 31/382 |
| 2002/0017893 A1 | * | 2/2002 | Duff, Jr. | H01G 9/155 |
| | | | | 320/100 |

* cited by examiner

*Primary Examiner* — Gary A Nash
(74) *Attorney, Agent, or Firm* — JCIPRNET

(57) ABSTRACT

A power conversion apparatus and a short circuit protection circuit and method of capacitor thereof are provided. A rectifier circuit rectifies an AC signal into a DC signal. An electrical energy storage circuit is coupled to the rectifier circuit, and the electrical energy storage circuit includes a plurality of capacitors connected in series. A detection circuit is coupled to the electrical energy storage circuit to detect cross voltages of the capacitors. A control circuit is coupled to the rectifier circuit and the detection circuit. When the cross voltage of any of the plurality of capacitors is greater than a preset voltage, the rectifier circuit is disabled by the control circuit.

15 Claims, 5 Drawing Sheets

US 10,784,773 B1

POWER CONVERSION APPARATUS AND SHORT CIRCUIT PROTECTION CIRCUIT AND METHOD OF CAPACITOR THEREOF

CROSS-REFERENCE TO RELATED APPLICATION

This application claims the priority benefit of Taiwan application serial no. 108121882, filed on Jun. 24, 2019. The entirety of the above-mentioned patent application is hereby incorporated by reference herein and made a part of this specification.

BACKGROUND OF THE INVENTION

1. Field of the Invention

The present invention relates to a protection apparatus, in particular, to a power conversion apparatus and a short circuit protection circuit and method of a capacitor thereof.

2. Description of Related Art

A motor converts electrical energy into kinetic energy. Generally, the motor is often driven by an inverter apparatus, and then drives other apparatuses. In the inverter apparatus, a rectifier circuit firstly converts input alternating current (AC) power to a direct current (DC) voltage, and then an inverter circuit converts the direct current voltage to a desired AC voltage and outputs the AC voltage. Generally speaking, the output end of the rectifier circuit is coupled to a tank circuit including capacitors connected in series and having large capacitance values, so as to ensure that the tank circuit withstands the voltage output by the rectifier circuit. In this way, although the problem on the withstand voltage of the tank circuit is effectively solved, the gradual aging of the capacitor will cause the capacitance value to drop rapidly, and the finally aged capacitor will not withstand a cross voltage applied thereon and be broken down to form a short circuit. Furthermore, remaining capacitors are also broken down by a rise of cross voltages applied thereon to form short circuits, so that continuous power transmission of a power input end will cause the insides of the capacitor and the apparatus to be heated and burnt and then result in a safety problem.

The existing solution is to prevent a spark from being thrown out from an electronic device by means of shielding by a mechanical component. However, the safety problem caused by the aging of the capacitor is not actually and effectively prevented.

SUMMARY OF THE INVENTION

A power conversion apparatus, a short circuit protection circuit and method of a capacitor are provided, so as to effectively prevent a safety problem caused by the aging of the capacitor.

A short circuit protection circuit of a capacitor comprises a rectifier circuit, an electrical energy storage circuit, a detection circuit and a control circuit. The rectifier circuit rectifies an alternating current (AC) signal into a direct current (DC) signal. The electrical energy storage circuit is coupled to the rectifier circuit, and the electrical energy storage circuit comprises a plurality of capacitors connected in series. The detection circuit is coupled to the electrical energy storage circuit to detect a cross voltage of each of the capacitors. The control circuit is coupled to the rectifier circuit and the detection circuit, and disables the rectifier circuit when the cross voltage of any of the plurality of capacitors is greater than a preset voltage.

In one embodiment, the short circuit protection circuit of the capacitor also comprises a precharging circuit, the precharging circuit is coupled to the electrical energy storage circuit and the control circuit. The control circuit controls the precharging circuit to precharge the electrical energy storage circuit before the rectifier circuit provides the DC signal for the electrical energy storage circuit.

In one embodiment, the control circuit disables the precharging circuit when the cross voltage of any of the plurality of capacitors is greater than the preset voltage.

In one embodiment, the precharging circuit comprises a resistor and a relay. The resistor provides a precharging path for precharging the electrical energy storage circuit. The relay is connected in parallel with the resistor. The control circuit controls the relay to enter an on state to bypass the resistor when the cross voltage of any of the capacitors is greater than the preset voltage.

In one embodiment, the electrical energy storage circuit comprises a first capacitor and a second capacitor. The second capacitor and the first capacitor are connected in series between the output end of the rectifier circuit and the ground. A common contact point of the first capacitor and the second capacitor is coupled to the detection circuit, and the detection circuit obtains cross voltages of the first capacitor and the second capacitor according to a voltage on the common contact point and the output voltage of the rectifier circuit.

In one embodiment, the voltage on the common contact point is equal to the cross voltage of one of the first capacitor and the second capacitor, and the cross voltage of the other one of the first capacitor and the second capacitor is equal to a voltage obtained by subtracting the voltage on the common contact point from the output voltage of the rectifier circuit.

A power conversion apparatus comprises a rectifier circuit, an electrical energy storage circuit, a detection circuit, an inverter circuit, a control circuit and a precharging circuit. The rectifier circuit rectifies an alternating current (AC) signal into a direct current (DC) signal. The electrical energy storage circuit is coupled to the rectifier circuit, and the electrical energy storage circuit comprises a plurality of capacitors connected in series. The detection circuit is coupled to the electrical energy storage circuit to detect a cross voltage of each of the capacitors. The inverter circuit is coupled to the electrical energy storage circuit to convert a DC voltage provided by the electrical energy storage circuit to an AC voltage. The control circuit is coupled to the rectifier circuit, the detection circuit and the inverter circuit, and disables the rectifier circuit and the inverter circuit when the cross voltage of any of the plurality of capacitors is greater than a preset voltage.

In one embodiment, the power conversion apparatus also comprises a precharging circuit, the precharging circuit is coupled to the electrical energy storage circuit and the control circuit. The control circuit controls the precharging circuit to precharge the electrical energy storage circuit before the rectifier circuit provides the DC signal for the electrical energy storage circuit.

In one embodiment, the control circuit disables the precharging circuit when the cross voltage of any of the plurality of capacitors is greater than the preset voltage.

In one embodiment, the precharging circuit comprises a resistor and a relay. The resistor provides a precharging path for precharging the electrical energy storage circuit. The relay is connected in parallel with the resistor. The control circuit controls the relay to enter an on state to bypass the resistor when the cross voltage of any of the capacitors is greater than the preset voltage.

In one embodiment, the electrical energy storage circuit comprises a first capacitor and a second capacitor, and the second capacitor and the first capacitor are connected in series between the output end of the rectifier circuit and the ground, and a common contact point of the first capacitor and the second capacitor is coupled to the detection circuit. The detection circuit obtains the cross voltages of the first capacitor and the second capacitor according to the voltage on the common contact point and the output voltage of the rectifier circuit.

In one embodiment, the voltage on the common contact point is equal to the cross voltage of one of the first capacitor and the second capacitor, and the cross voltage of the other one of the first capacitor and the second capacitor is equal to a voltage obtained by subtracting the voltage on the common contact point from the output voltage of the rectifier circuit.

A protection method of a short circuit protection circuit of a capacitor is provided. The short circuit protection circuit of the capacitor comprises a rectifier circuit and an electrical energy storage circuit. The electrical energy storage circuit comprises a plurality of capacitors connected in series. The protection method of the short circuit protection circuit of the capacitor comprises the following steps: controlling the rectifier circuit to rectify an alternating current (AC) signal into a direct current (DC) signal, so as to provide the DC signal for the electrical energy storage circuit; detecting a cross voltage of each of the capacitors; and disabling the rectifier circuit when the cross voltage of any of the plurality of capacitors is greater than a preset voltage.

In one embodiment, the short circuit protection circuit of the capacitor also comprises a precharging circuit. The protection method of the short circuit protection circuit of the capacitor comprises: controlling the precharging circuit to precharge the electrical energy storage circuit before the rectifier circuit provides the DC signal for the electrical energy storage circuit.

In one embodiment, the precharging circuit is disabled when the cross voltage of any of the plurality of capacitors is greater than the preset voltage.

In one embodiment, the precharging circuit comprises a resistor and a relay. The relay is connected in parallel with the resistor. The resistor provides a precharging path for precharging the electrical energy storage circuit. The relay is controlled to enter an on state to bypass the resistor when the cross voltage of any of the plurality of capacitors is greater than the preset voltage.

In one embodiment, the electrical energy storage circuit comprises a first capacitor and a second capacitor. The first capacitor and the second capacitor are connected in series between the output end of the rectifier circuit and the ground. The protection method of the short circuit protection circuit of the capacitor comprises: obtaining the cross voltages on the first capacitor and the second capacitor according to a voltage on a common contact point and the output voltage of the rectifier circuit.

In one embodiment, the voltage on the common contact point is equal to the cross voltage of one of the first capacitor and the second capacitor, and the cross voltage of the other one of the first capacitor and the second capacitor is equal to a voltage obtained by subtracting the voltage on the common contact point from the output voltage of the rectifier circuit.

Based on the above, the control circuit disables the rectifier circuit when the cross voltage of any of the plurality of capacitors connected in series in the electrical energy storage circuit is greater than the preset voltage, so as to prevent a power input end from continuously transmitting power to the capacitor and then causing the insides of the capacitor and the apparatus to be heated and burnt, which effectively solves the safety problem caused by the aging of the capacitor.

In order to make the aforementioned and other descriptions comprehensible, embodiments accompanied with figures are described in detail below.

DESCRIPTION OF THE EMBODIMENTS

Figure 1:
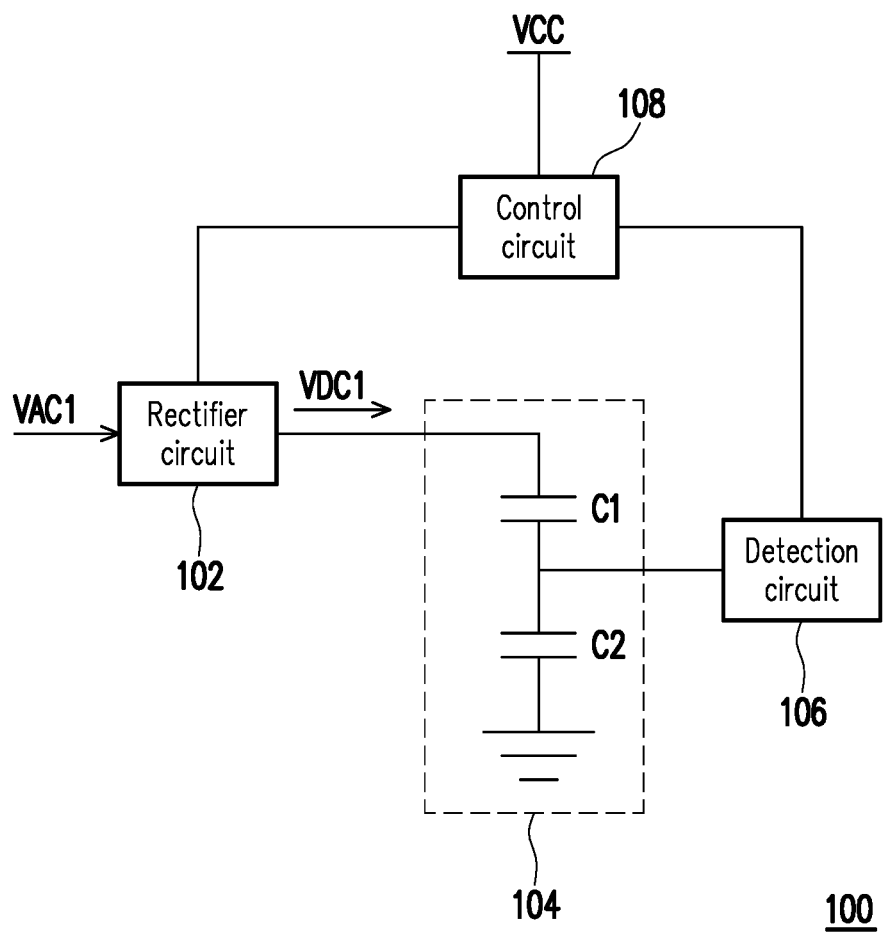
FIG. 1 illustrates a schematic diagram of a short circuit protection circuit of a capacitor according to one embodiment.

Referring to FIG. 1, FIG. 1 illustrates a schematic diagram of a short circuit protection circuit of a capacitor according to one embodiment. The short circuit protection circuit of a capacitor 100 comprises a rectifier circuit 102, an electrical energy storage circuit 104, a detection circuit 106 and a control circuit 108. The rectifier circuit 102 is coupled to the electrical energy storage circuit 104 and the control circuit 108. The detection circuit 106 is coupled to the storage circuit 104 and the control circuit 108. In the present embodiment, the electrical energy storage circuit 104 comprises a capacitor C1 and a capacitor C2 which are connected in series between the output end of the rectifier circuit 102 and the ground. However, it should be noted that the number of the capacitors connected in series is not limited thereto. In other embodiments, the electrical energy storage circuit 104 also comprises a plurality of capacitors connected in series.

The rectifier circuit 102 receives an alternating current (AC) signal VAC1 and rectify the AC signal VAC1 into a direct current (DC) signal VDC1. The capacitor C1 and the capacitor C2 which are connected in series receive the DC signal VDC1 to store electrical energy. The detection circuit 106 detects cross voltages of the capacitor C1 and the capacitor C2. For example, in the present embodiment, the detection circuit 106 is coupled to a common contact point of the capacitor C1 and the capacitor C2 to directly obtain the cross voltage of the capacitor C2, and the cross voltage of the capacitor C1 is obtained by subtracting the cross voltage of the capacitor C2 from a voltage value of the DC signal VDC1 provided by the rectifier circuit 102. In partial embodiments, the detection circuit 106 also directly detects the cross voltages of the capacitor C1 and the capacitor C2. The detection method of the cross voltages of the capacitor C1 and the capacitor C2 is not limited to the present embodiment.

The control circuit 108 determines whether the cross voltage of the capacitor C1 or the capacitor C2 is greater than a preset voltage according to a detection result of the detection circuit 106. When the cross voltage of one of the capacitor C1 and the capacitor C2 is greater than the preset voltage, it is indicated that the other one of the capacitor C1 and the capacitor C2 is aged or short-circuited. For example, when the cross voltage of the capacitor C1 is greater than the preset voltage, it is indicated that the capacitor C2 is aged and then the capacitance value of the capacitor C2 drops. The capacitor C1 and the capacitor C2 are connected in series, and the voltage (namely the voltage of the DC signal VDC1) applied to the capacitor C1 and the capacitor C2 which are connected in series is fixed, so that most of the voltage drop will occur on the capacitor C1, that is, a non-uniform voltage division occurs on the capacitor C1 and the capacitor C2. Therefore, when the control circuit 108 determines that the cross voltage of the capacitor C1 or the capacitor C2 is greater than the preset voltage, which reflects that one of the capacitor C1 or the capacitor C2 is aged, the control circuit 108 disables the rectifier circuit 102 at the moment to stop the rectifier circuit 102 from rectifying the AC signal VAC1 and outputting the DC signal VDC1. In this way, the voltage is prevented from being continuously transmitted to the capacitor C1 and the capacitor C2 to cause the capacitor C1 and the capacitor C2 to be heated and burnt, and the safety problem caused by the aging of the capacitor is effectively solved.

In addition, the control circuit 108 receives an operating voltage VCC as the power for running. The operating voltage VCC is, for example, a DC voltage obtained by converting an AC voltage provided by another AC power supply independent of a power supply that provides the AC signal VAC1. Therefore, after the control circuit 108 disables the rectifier circuit 102 due to the aging of the capacitor C1 or the capacitor C2, the control circuit 108 still continuously runs depending on the operating voltage VCC.

Figure 2:
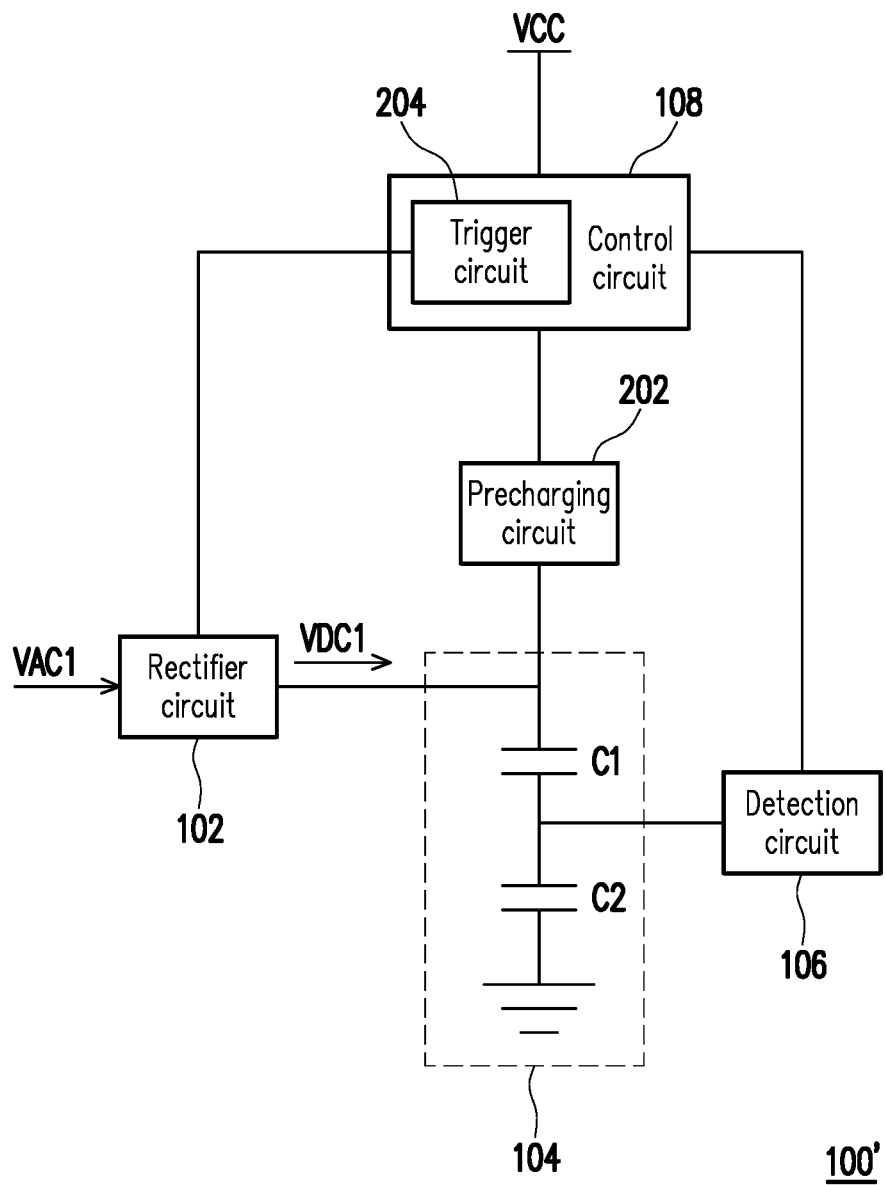
FIG. 2 illustrates a schematic diagram of the short circuit protection circuit of the capacitor according to another embodiment.

FIG. 2 illustrates a schematic diagram of a short circuit protection circuit of a capacitor according to another embodiment. In the present embodiment, the short circuit protection circuit of a capacitor 100' also comprises a precharging circuit 202. Moreover, the control circuit 108 comprises a trigger circuit 204. The trigger circuit 204 is, for example, a 555 SCR trigger circuit, but is not limited thereto. Under the condition that the short circuit protection circuit of a capacitor 100' is applied to a high voltage, for example, under the condition that the DC signal VDC1 is more than or equal to 600 V, in order to avoid the input voltage from generating a surge current to damage the capacitors or other elements in the electrical energy storage circuit 104, the control circuit 108 executes soft start to control the precharging circuit 202 to precharge the electrical energy storage circuit 104 before the rectifier circuit 102 provides the DC signal VDC1 for the electrical energy storage circuit 104, so as to charge the capacitor C1 and the capacitor C2 to a preset voltage at first.

In the present embodiment, when the control circuit 108 determines that the cross voltage of the capacitor C1 or the capacitor C2 is greater than the preset voltage, namely that the capacitor C1 or the capacitor C2 is aged, the control circuit 108 controls the trigger circuit 204 to disable the rectifier circuit 102, and also disables the precharging function of the precharging circuit 202 at the same time. For example, a precharging path for the electrical energy storage circuit 104 is cut off to avoid, under the condition that the rectifier circuit 102 is disabled, the precharging circuit 202 from continuously precharging the electrical energy storage circuit 104 and then damaging the capacitors or other elements in the electrical energy storage circuit 104. The precharging circuit 202 recovers the precharging function after the aged capacitor C1 or capacitor C2 is removed and replaced. The precharging circuit 202 is, for example, implemented by connecting a relay with a resistor in parallel. When the control circuit 108 executes the soft start, the relay maintains an on state, so that a precharging current flows through the resistor to precharge the electrical energy storage circuit 104. When the electrical energy storage circuit 104 is charged to a preset value, the relay is controlled by the control circuit 108 to enter an on state to bypass the resistor, so as to guide the precharging current to leave the precharging path. For example, the precharging current is guided to the ground or other circuits and avoided from continuously charging the electrical energy storage circuit 104. When the condition that one of the capacitor C1 or the capacitor C2 is aged is determined, the control circuit 108 controls the relay to maintain the on state, so as to avoid the precharging current from continuously precharging the electrical energy storage circuit 104 via the resistor under the condition that the rectifier circuit 102 is disabled.

Figure 3:
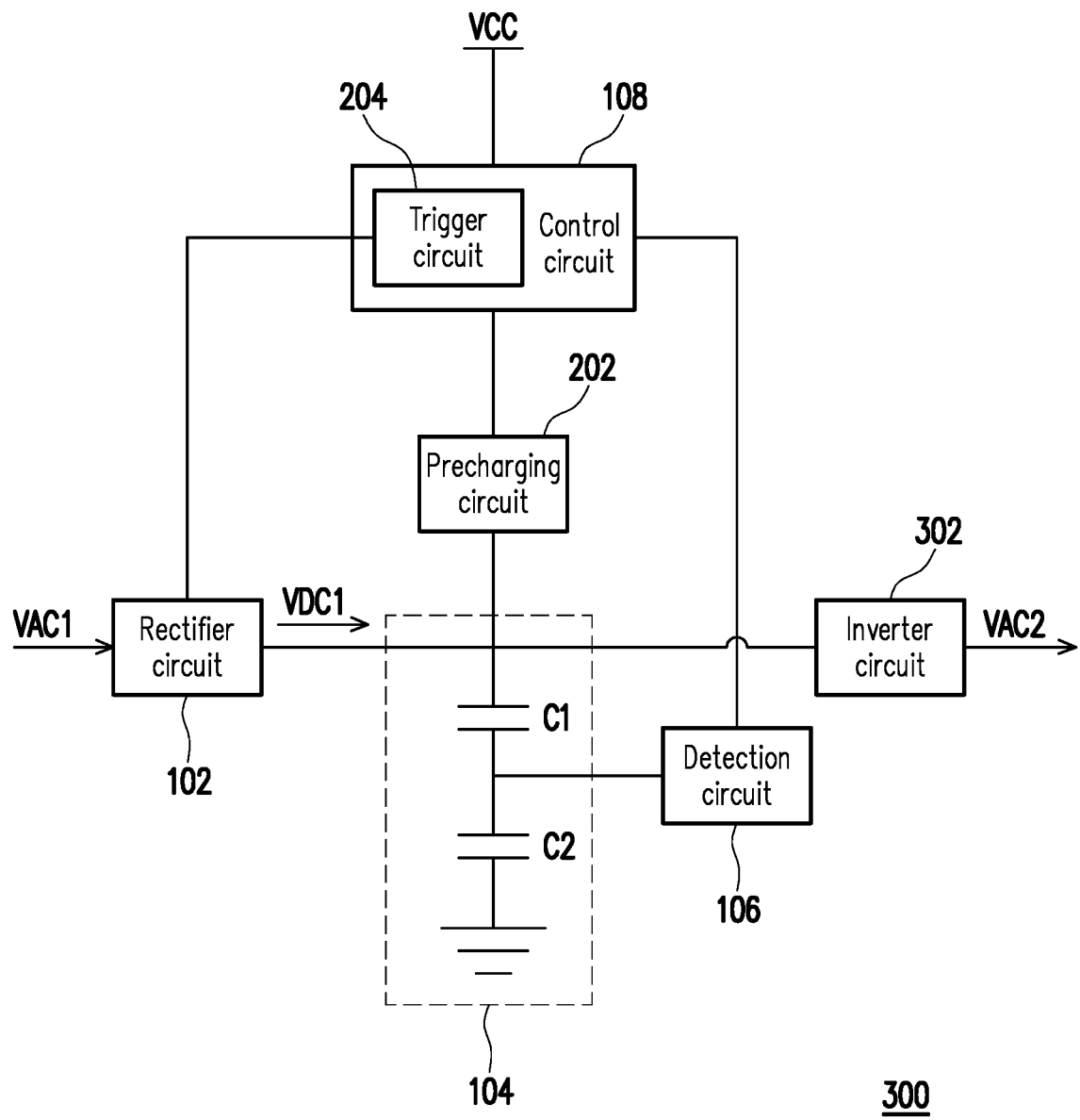
FIG. 3 illustrates a schematic diagram of a power conversion apparatus according to one embodiment.

FIG. 3 illustrates a schematic diagram of a power conversion apparatus according to one embodiment. Referring to FIG. 3, the short circuit protection circuit of the capacitor of the above embodiments is, for example, applied into a power conversion apparatus 300. For example, an inverter apparatus of the present embodiment is, for example, configured to drive a motor. In other embodiments, the short circuit protection circuit of the capacitor is also, for example, applied to a continuous power supply, a solar power generation apparatus or a wind power generation apparatus. As shown in FIG. 3, in addition to the short circuit protection circuit of the capacitor, the power conversion apparatus also comprises an inverter circuit 302. The inverter circuit 302 is coupled to the electrical energy storage circuit 104 to convert a direct current (DC) voltage provided by the electrical energy storage circuit 104 to an alternating current (AC) voltage VAC2. Similarly, the control circuit 108 of the present embodiment executes soft start to control the precharging circuit 202 to precharge the electrical energy storage circuit 104 before the rectifier circuit 102 provides the DC signal VDC1 for the electrical energy storage circuit 104, so as to charge the capacitor C1 and the capacitor C2 to a preset voltage at first to avoid the input voltage from generating a surge current to damage the capacitors or other elements in the electrical energy storage circuit 104. When the control circuit 108 determines that the cross voltage of the capacitor C1 or the capacitor C2 is greater than the preset voltage, the control circuit 108 disables the rectifier circuit 102 and the precharging circuit 202, and also disables the inverter circuit 302, so as to avoid the inverter circuit 302 from being damaged or abnormal.

In addition, as described in the above embodiments, since a voltage source of the operating voltage VCC received by the control circuit 108 is independent of a power supply that provides the AC signal VAC1, the control circuit 108 still maintains normal running after disabling the rectifier circuit 102 due to the aging of the capacitor C1 or the capacitor C2. For example, in the case that the rectifier circuit 102 is disabled, the control circuit 108 still controls a warning apparatus (such as a display or a warning lamp) to provide warning information, so as to inform a user of an abnormal state or inform the user of an aged capacitor, etc.

Figure 4:
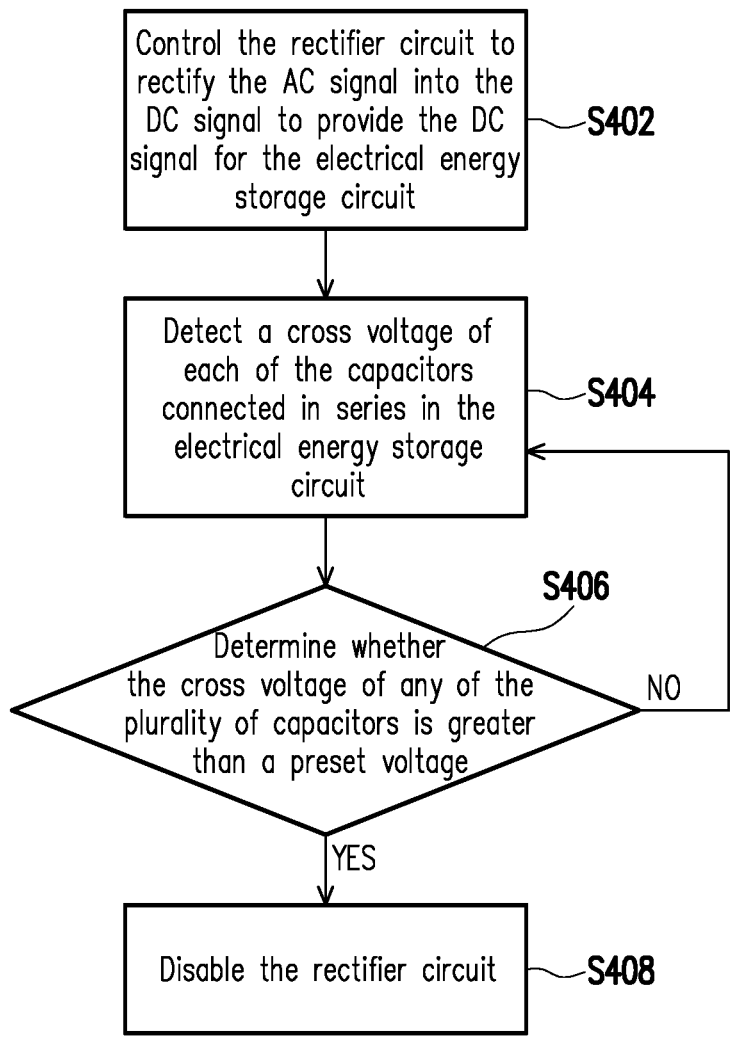
FIG. 4 illustrates a flowchart of a protection method of a short circuit protection circuit of a capacitor according to one embodiment.

FIG. 4 illustrates a flowchart of a protection method of a short circuit protection circuit of a capacitor according to one embodiment. According to the above embodiments, the protection method of the short circuit protection circuit of the capacitor at least comprises the following steps. Firstly, a rectifier circuit is controlled to rectify an alternating current (AC) signal into a direct current (DC) signal, so as to provide the DC signal for an electrical energy storage circuit (Step S402). The electrical energy storage circuit comprises a plurality of capacitors connected in series. Then, a cross voltage of each of the capacitors in the electrical energy storage circuit is detected (Step S404). For example, if the electrical energy storage circuit comprises two capacitors connected in series, the cross voltage of one of the two capacitors is detected, and the cross voltage of the other capacitor is obtained by subtracting the detected cross voltage of the capacitor from a voltage value of the DC signal provided by the rectifier circuit. In partial embodiments, the cross voltages of the two capacitors are also directly detected respectively. Then, whether the cross voltage of any of the plurality of capacitors is greater than a preset voltage is determined (Step S406). If there is no cross voltage of any capacitor is greater than the preset voltage, Step S406 is continued to detect the cross voltages of the capacitors. If the cross voltage of any of the capacitors is greater than the preset voltage, it is indicated that there is a capacitor being aged or short-circuited, and the rectifier circuit is disabled at the moment (Step S408), so as to prevent the voltage from being continuously transmitted to the capacitor of the electrical energy storage circuit and then causing the capacitor to be heated and burnt, and then effectively solve the safety problem caused by the aging of the capacitor.

Figure 5:
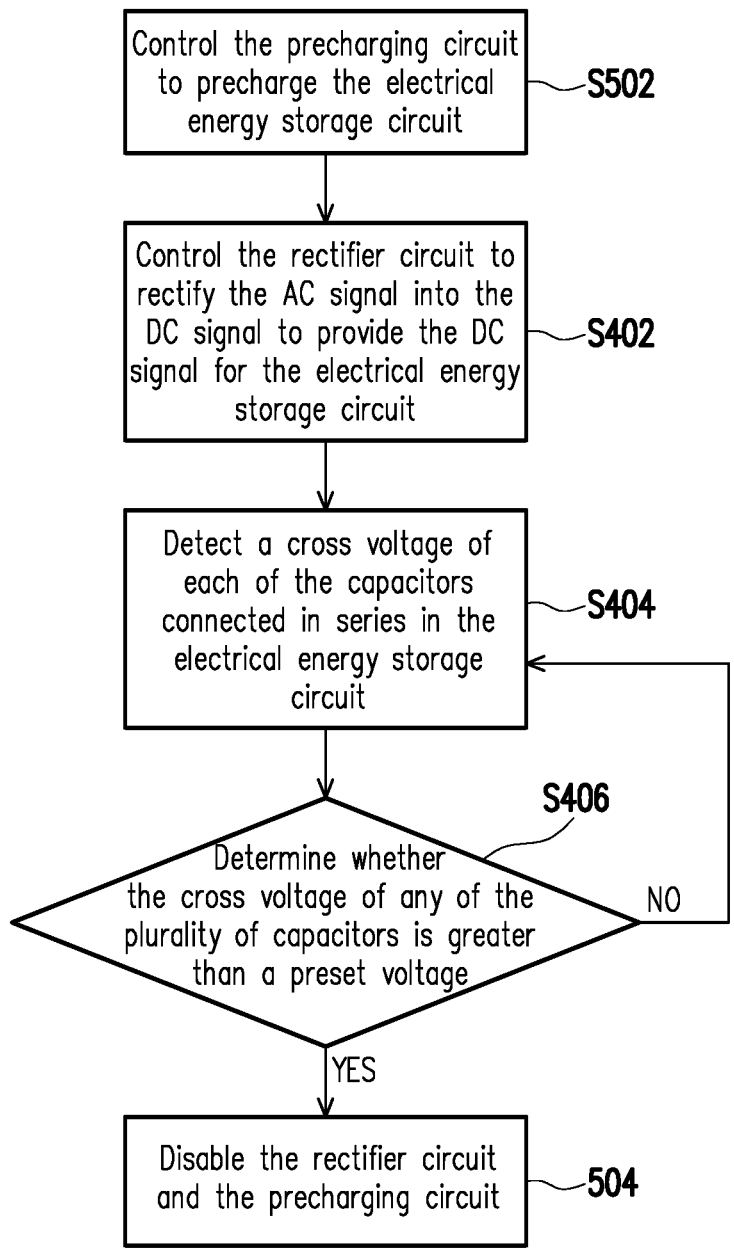
FIG. 5 illustrates a flowchart of the protection method of the short circuit protection circuit of the capacitor according to another embodiment.

FIG. 5 illustrates a flowchart of the protection method of the short circuit protection circuit of the capacitor according to another embodiment. In the present embodiment, before the DC signal is provided for the electrical energy storage circuit (Step S402), a precharging circuit is controlled to precharge the electrical energy storage circuit (Step S502), so that the input voltage is prevented from generating a surge current and then damaging the capacitors or other elements in the electrical energy storage circuit. Meanwhile, when the cross voltage of any of the plurality of capacitors is determined to be greater than the preset voltage (the determination result of Step S406 is YES), the rectifier circuit and the precharging circuit are simultaneously disabled (Step S504), so as to avoid, in the case that the rectifier circuit is disabled, the precharging circuit from continuously precharging the electrical energy storage circuit and then damaging the capacitors or other elements in the electrical energy storage circuit. In partial embodiments, the precharging circuit, for example, comprises a resistor and a relay. The relay is connected in parallel with the resistor. The resistor provides a precharging path for precharging the electrical energy storage circuit. When the cross voltage of any of the plurality of capacitors is greater than the preset voltage, the relay is controlled to enter an on state to bypass the resistor, so as to avoid the precharging circuit from continuously precharging the electrical energy storage circuit.

Based on the above, according to the embodiments, the rectifier circuit is disabled when the cross voltage of any of the plurality of capacitors connected in series in the electrical energy storage circuit is greater than the preset voltage, so as to avoid a power input end from continuously transmitting power to the capacitor and then causing the insides of the capacitor and the apparatus to be heated and burnt, which effectively solves the safety problem caused by the aging of the capacitor. In partial embodiments, the rectifier circuit and the precharging circuit are simultaneously disabled when the cross voltage of any of the plurality of capacitors connected in series in the electrical energy storage circuit is greater than the preset voltage, so as to avoid, in the case that the rectifier circuit is disabled, the precharging circuit from continuously precharging the electrical energy storage circuit and then causing the capacitors or other elements in the electrical energy storage circuit to be damaged, and further prevent the safety problems.

Although the present invention has disclosed the above embodiments, but the embodiments are not intended to limit the present invention. Any one of ordinary skill in the art can make some changes and refinements without departing from the spirit or scope. Therefore, the protection scope shall be defined by the scope of the appended claims.

What is claimed is:

1. A short circuit protection circuit of a capacitor, comprising:
    a rectifier circuit, configured to rectify an alternating current (AC) signal into a direct current (DC) signal;
    an electrical energy storage circuit, coupled to the rectifier circuit, the electrical energy storage circuit comprising a plurality of capacitors connected in series;
    a detection circuit, coupled to the electrical energy storage circuit to detect a cross voltage of each of the capacitors;
    a control circuit, coupled to the rectifier circuit and the detection circuit, and configured to disable the rectifier circuit when the cross voltage of any of the plurality of capacitors is greater than a preset voltage; and
    a precharging circuit, coupled to the electrical energy storage circuit and the control circuit, wherein the control circuit controls the precharging circuit to precharge the electrical energy storage circuit before the rectifier circuit provides the DC signal for the electrical energy storage circuit.

2. The short circuit protection circuit of the capacitor according to claim 1, wherein the control circuit disables the precharging circuit when the cross voltage of any of the plurality of capacitors is greater than the preset voltage.

3. The short circuit protection circuit of the capacitor according to claim 1, wherein the precharging circuit comprises:
    a resistor, configured to provide a precharging path for precharging the electrical energy storage circuit; and
    a relay, connected in parallel with the resistor, wherein the control circuit controls the relay to enter an on state to bypass the resistor when the cross voltage of any of the capacitors is greater than the preset voltage.

4. The short circuit protection circuit of the capacitor according to claim 1, wherein the electrical energy storage circuit comprises:
    a first capacitor; and
    a second capacitor; the second capacitor and the first capacitor are connected in series between the output end of the rectifier circuit and the ground; a common contact point of the first capacitor and the second capacitor is coupled to the detection circuit, and the detection circuit obtains cross voltages on the first capacitor and the second capacitor according to a voltage on the common contact point and the output voltage of the rectifier circuit.

5. The short circuit protection circuit of the capacitor according to claim 4, wherein the voltage on the common contact point is equal to the cross voltage of one of the first capacitor and the second capacitor, and the cross voltage of the other one of the first capacitor and the second capacitor is equal to a voltage obtained by subtracting the voltage on the common contact point from the output voltage of the rectifier circuit.

6. A power conversion apparatus, comprising:
a rectifier circuit, configured to rectify an alternating current (AC) signal into a direct current (DC) signal;
an electrical energy storage circuit, coupled to the rectifier circuit, the electrical energy storage circuit comprising a plurality of capacitors connected in series;
a detection circuit, coupled to the electrical energy storage circuit to detect a cross voltage of each of the capacitors;
an inverter circuit, coupled to the electrical energy storage circuit to convert a DC voltage provided by the electrical energy storage circuit to an AC voltage;
a control circuit, coupled to the rectifier circuit, the detection circuit and the inverter circuit, and configured to disable the rectifier circuit and the inverter circuit when the cross voltage of any of the plurality of capacitors is greater than a preset voltage; and
a precharging circuit, coupled to the electrical energy storage circuit and the control circuit, wherein the control circuit controls the precharging circuit to precharge the electrical energy storage circuit before the rectifier circuit provides the DC signal for the electrical energy storage circuit.

7. The power conversion apparatus according to claim 6, wherein the control circuit disables the precharging circuit when the cross voltage of any of the plurality of capacitors is greater than the preset voltage.

8. The power conversion apparatus according to claim 6, wherein the precharging circuit comprises
a resistor, configured to provide a precharging path for precharging the electrical energy storage circuit; and
a relay, connected in parallel with the resistor; the control circuit controls the relay to enter an on state to bypass the resistor when the cross voltage of any of the capacitors is greater than the preset voltage.

9. The power conversion apparatus according to claim 6, wherein the electrical energy storage circuit comprises:
a first capacitor; and
a second capacitor; the second capacitor and the first capacitor are connected in series between the output end of the rectifier circuit and the ground, and a common contact point of the first capacitor and the second capacitor is coupled to the detection circuit; and the detection circuit obtains the cross voltages on the first capacitor and the second capacitor according to the voltage on the common contact point and the output voltage of the rectifier circuit.

10. The power conversion apparatus according to claim 9, wherein the voltage on the common contact point is equal to the cross voltage of one of the first capacitor and the second capacitor, and the cross voltage of the other one of the first capacitor and the second capacitor is equal to a voltage obtained by subtracting the voltage on the common contact point from the output voltage of the rectifier circuit.

11. A protection method of a short circuit protection circuit of a capacitor, wherein the short circuit protection circuit of the capacitor comprises a rectifier circuit and an electrical energy storage circuit; the electrical energy storage circuit comprises a plurality of capacitors connected in series; the protection method of the short circuit protection circuit of the capacitor comprises:
controlling the rectifier circuit to rectify an alternating current (AC) signal into a direct current (DC) signal, so as to provide the DC signal for the electrical energy storage circuit;
detecting a cross voltage of each of the capacitors; and
disabling the rectifier circuit when the cross voltage of any of the plurality of capacitors is greater than a preset voltage,
wherein the short circuit protection circuit of the capacitor also comprises a precharging circuit, the protection method of the short circuit protection circuit of the capacitor further comprises:
controlling the precharging circuit to precharge the electrical energy storage circuit before the rectifier circuit provides the DC signal for the electrical energy storage circuit.

12. The protection method of the short circuit protection circuit of the capacitor according to claim 11, wherein the precharging circuit is disabled when the cross voltage of any of the plurality of capacitors is greater than the preset voltage.

13. The protection method of the short circuit protection circuit of the capacitor according to claim 11, wherein the precharging circuit comprises a resistor and a relay; the relay is connected in parallel with the resistor; the resistor provides a precharging path for precharging the electrical energy storage circuit; and the relay is controlled to enter an on state to bypass the resistor when the cross voltage of any of the plurality of capacitors is greater than the preset voltage.

14. The protection method of the short circuit protection circuit of the capacitor according to claim 11, wherein the electrical energy storage circuit comprises a first capacitor and a second capacitor; the first capacitor and the second capacitor are connected in series between the output end of the rectifier circuit and the ground; the protection method of the short circuit protection circuit of the capacitor comprises:
obtaining the cross voltages on the first capacitor and the second capacitor according to a voltage on a common contact point and the output voltage of the rectifier circuit.

15. The protection method of the short circuit protection circuit of the capacitor according to claim 14, wherein the voltage on the common contact point is equal to the cross voltage of one of the first capacitor and the second capacitor, and the cross voltage of the other one of the first capacitor and the second capacitor is equal to a voltage obtained by subtracting the voltage on the common contact point from the output voltage of the rectifier circuit.

* * * * *